United States Patent Office 2,713,042
Patented July 12, 1955

2,713,042
POLYMERIZATION WITH POLYMERIC ADIPOYL PEROXIDE CATALYST

Harold F. Park, East Longmeadow, Mass., assignor to Monsanto Chemical Company, St. Louis, Mo., a corporation of Delaware No Drawing. Application October 24, 1952,
Serial No. 316,789

4 Claims. (Cl. 260—78.5)

This invention relates to a process for preparing homopolymers of styrene, homopolymers of vinyl halides and copolymers of each of these compounds with vinylidene compounds. More particularly, the invention relates to a mass polymerization process for preparing the homopolymers and copolymers.

One object of this invention is to provide a process for polymerizing styrene and vinyl halides.

A further object of this invention is to provide a new catalyst system for polymerizing styrene and vinyl halides.

These and other objects are attained by polymerizing styrene or a vinyl halide alone or admixed with different vinylidene monomers copolymerizable therewith at temperatures between 100 and 400° C. and pressures between 1 and 500 atmospheres pressure in the presence of polymeric adipoyl peroxide.

The following examples are given in illustration and are not intended as limitations on the scope of this invention.

Example I

Monomeric vinyl chloride containing substantially no oxygen was charged into a stainless steel bomb containing polymeric adipoyl peroxide as a polymerization catalyst. 100 parts of vinyl chloride were used for each 0.1 part of catalyst. The bomb was then heated at about 260° C. under a pressure of 500 atmospheres for about 2 hours. Pressure was then released and the reaction product removed. An 86% yield of a solid, tough and resilient vinyl chloride polymer was obtained which could be easily molded and extruded by conventional means such as compression or injection molding or screw extrusion to yield transparent articles.

Example II

A mixture of 100 parts of pure monomeric styrene and 1.0 part of polymeric adipoyl peroxide was placed in a stainless steel pipe capped at one end. The mixture was boiled for about 15 minutes at atmospheric pressure to remove dissolved oxygen. The mixture was then cooled in a nitrogen atmosphere and the other end of the pipe was firmly capped so that both ends were sealed. The sealed pipe was then placed in a molten tin bath at a temperature of 370° C. and kept in said bath at a temperature of 370° C. for 5 minutes. The pipe was then removed from the bath, cooled to room temperature and opened. A solid transparent rod of polystyrene was obtained which was thermoplastic and could be easily molded by the conventional injection or compression molding processes.

When the process of Example II was repeated, using no catalyst or benzoyl peroxide as a catalyst, the product was a friable weak polymer which could not be molded by the conventional molding methods.

Example III 70 parts of vinyl chloride were copolymerized with 30 parts of diethyl maleate in contact with 0.1 part of polymeric adipoyl peroxide at 200° C. and 100 atmospheres pressure in the substantial absence of oxygen. A tough, flexible, easily molded copolymer was obtained.

Example IV

A mixture of 70 parts of styrene, 30 parts of alpha methyl styrene and 0.1 part of polymeric adipoyl peroxide was placed in a stainless steel pipe capped at one end. The mixture was boiled for about 15 minutes at atmospheric pressure to remove dissolved oxygen. The mixture was then cooled in a nitrogen atmosphere and the other end of the pipe was firmly capped so that both ends were sealed. The sealed pipe was then placed in a molten tin bath at 370° C. and kept in said bath at a temperature of 370° C. for 5 minutes. The pipe was then removed from the bath, cooled to room temperature and opened. A solid transparent rod of a copolymer of styrene and alpha methyl styrene was obtained which could be easily molded by conventional means.

The process of this invention may be carried out at temperatures between 100° C. and 400° C. It is preferable to carry out the invention in the absence of oxygen and other materials which are known to cause polymerization at temperatures below 100° C. The length of the polymerization cycle determines to some extent the molecular weight of the polymer produced. A short cycle at 400° C. can be used to obtain polymers of relatively low molecular weight and a long cycle at 100° C. may be used to produce polymers of considerably higher molecular weight but still moldable in nature.

The amount of catalyst used may vary between 0.01 part and 5 parts per 100 parts of monomer. At the lower part of the range, polymerization is slow unless the higher temperature range is used, and the molecular weight of the polymer is relatively high. At from 3 to 5 parts, polymerization is quite rapid even at 100° C. and the product is so low in molecular weight that it approaches the lower limit of moldability. In order to obtain the most accurate control of the reaction rate and to produce an optimum range of moldable polymers, the amount of catalyst is preferably restricted to from 0.1 to 1.0 part per 100 parts of monomer.

The process may be carried out at pressures ranging from 1 to 500 atmospheres, depending on the volatility of the monomers and the temperatures used. For vinyl chloride, the pressure should be at least 25 atmospheres.

The process of this invention is applicable to styrene and mixtures of styrene with vinylidene compounds in which mixtures the styrene constitutes the major proportion by weight. Among the compounds which may be polymerized with styrene in the process of this invention are alpha-alkyl styrenes such as alpha methyl styrene; chlorostyrenes such as p-chlorostyrene, 2,5-dichlorostyrene, divinyl benzene, vinyl pyridine, vinyl quinolines; vinyl esters such as vinyl acetate, vinyl butyrate; acrylic and alpha-substituted acrylic acids and the esters, nitriles and amides thereof such as methyl acrylate, ethyl acrylate, acrylonitrile, acrylamide, methyl methacrylate, butyl methacrylate, methyl phenacrylate, methacrylonitrile, methacrylamide, etc.; alpha,beta-ethylenically unsaturated dicarboxylic acids and anhydrides and the esters and amides and nitriles thereof such as maleic acid, maleic anhydride, fumaric acid, fumaronitrile, etc.; dienes such as butadiene, isoprene, piperylene, etc.

In place of the vinyl chloride used in the examples, other vinyl halides or mixtures of vinyl halides with other polymerizable vinylidene compounds may be used. Thus, vinyl fluoride, vinyl bromide or vinyl iodide may be polymerized alone or in conjunction with vinylidene compounds such as vinylidene chloride, vinylidene fluoride, 1,1-chlorofluoroethylene; vinyl esters including vinyl acetate, vinyl butyrate, vinyl laurate, vinyl stearate, etc.; vinyl ethers including vinyl methyl ether, vinyl ethyl ether, vinyl octyl ether, etc.; acrylic acid, acrylonitrile, acrylic esters including methyl, ethyl, propyl, phenyl, etc. acrylates, acrylamide, alpha-substituted acrylic acids, nitriles, esters and amides such as methacrylic acid, methacrylonitrile, ethyl methacrylate, methacrylamide, methyl methacrylate, atroponitrile, etc.; the acids, esters and amides of alpha,-beta-ethylenically unsaturated dicarboxylic acids such as the fumaric, maleic, citraconic, itaconic, etc. acids, their amides and esters, etc. If a copolymer is prepared by the process of this invention, it should contain more than 50% by weight of vinyl halide.

The process of this invention is limited to mass polymerization since polymeric adipoyl peroxide is ineffective in solution or aqueous emulsion polymerization.

The catalyst of this invention is prepared by dissolving 1 mol of adipoyl dichloride in toluene and adding the solution to an aqueous solution containing from 0.7 to 1.0 mol of sodium peroxide. Adipoyl dichloride also known as adipyl chloride is the di(acid chloride) of adipic acid. If less than 0.7 mol of sodium peroxide is used, the average degree of polymerization is less than 6 and such low polymers are relatively ineffective in the process of this invention. An excess of sodium peroxide may be used if desired. When 1.0 mol of sodium peroxide is used for each mol of adipoyl dichloride, there is formed almost immediately a polymer of such a high degree of polymerization that it is insoluble in known organic solvents. This high molecular weight insoluble polymer is particularly effective in the process of this invention and is the one used in the examples.

The particular advantage of the process of this invention is the rapidity with which useful polymeric products may be obtained.

This application is a continuation-in-part of my applications Serial No. 128,472 and Serial No. 128,482, both filed November 19, 1949, now abandoned.

It is obvious that variations may be made in the products and processes of this invention without departing from the spirit and scope thereof as defined by the appended claims.

What is claimed is:

1. A mass polymerization process which comprises polymerizing 100 parts of a compound taken from the group consisting of styrene and vinyl halides at from 100 to 400° C. and 1 to 500 atmospheres pressure in contact with from 0.01 to 5.0 parts of a polymeric adipoyl peroxide having an average degree of polymerization of more than 6.

2. A process as in claim 1 wherein the compound is styrene.

3. A process as in claim 1 wherein the compound is vinyl chloride.

4. A process as in claim 1 wherein the compound is copolymerized with less than an equal amount by weight of a different vinylidene monomer copolymerizable therewith.

References Cited in the file of this patent
UNITED STATES PATENTS
2,511,480    Roedel _____ June 13, 1950